Patented Aug. 6, 1929.

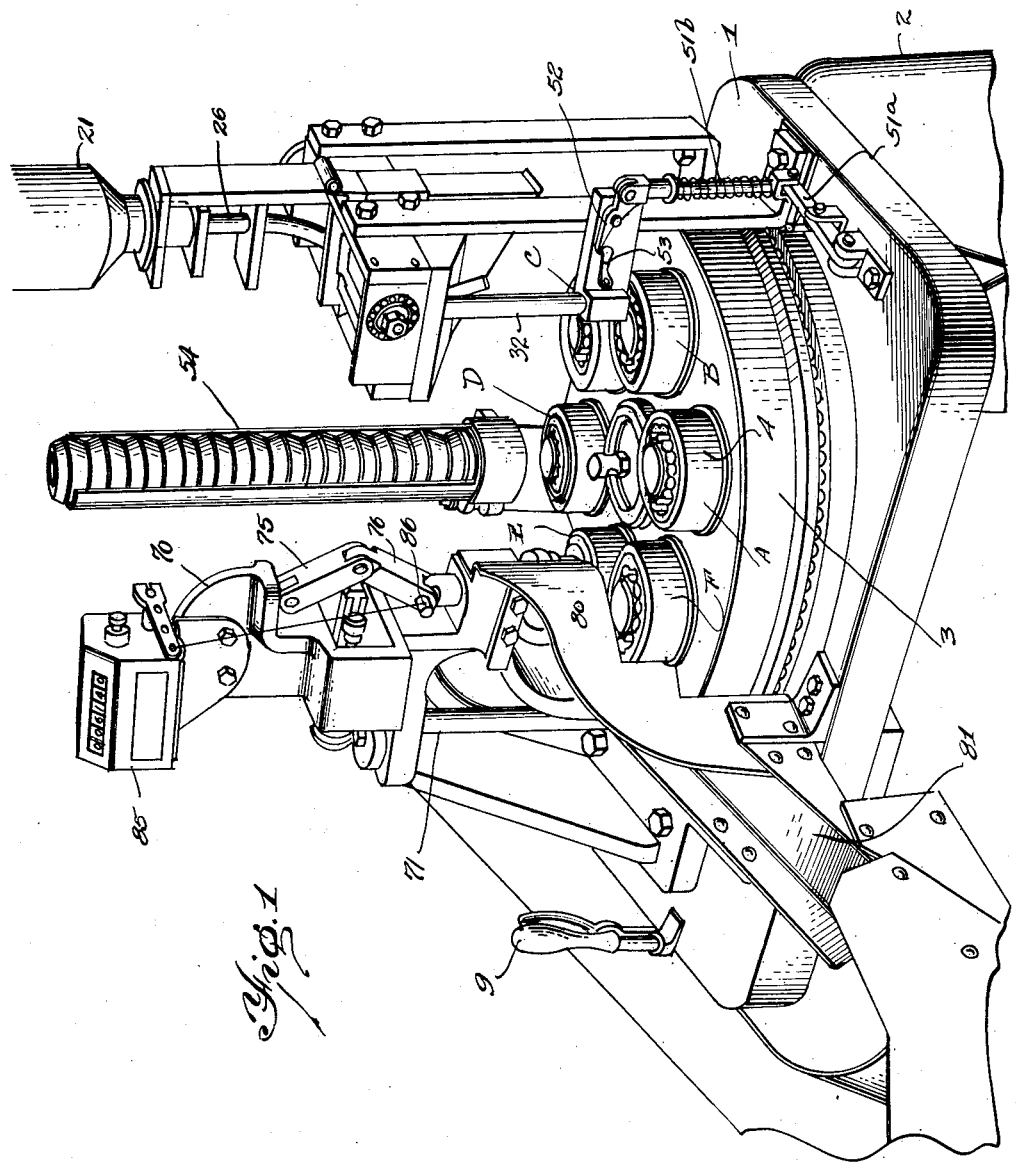

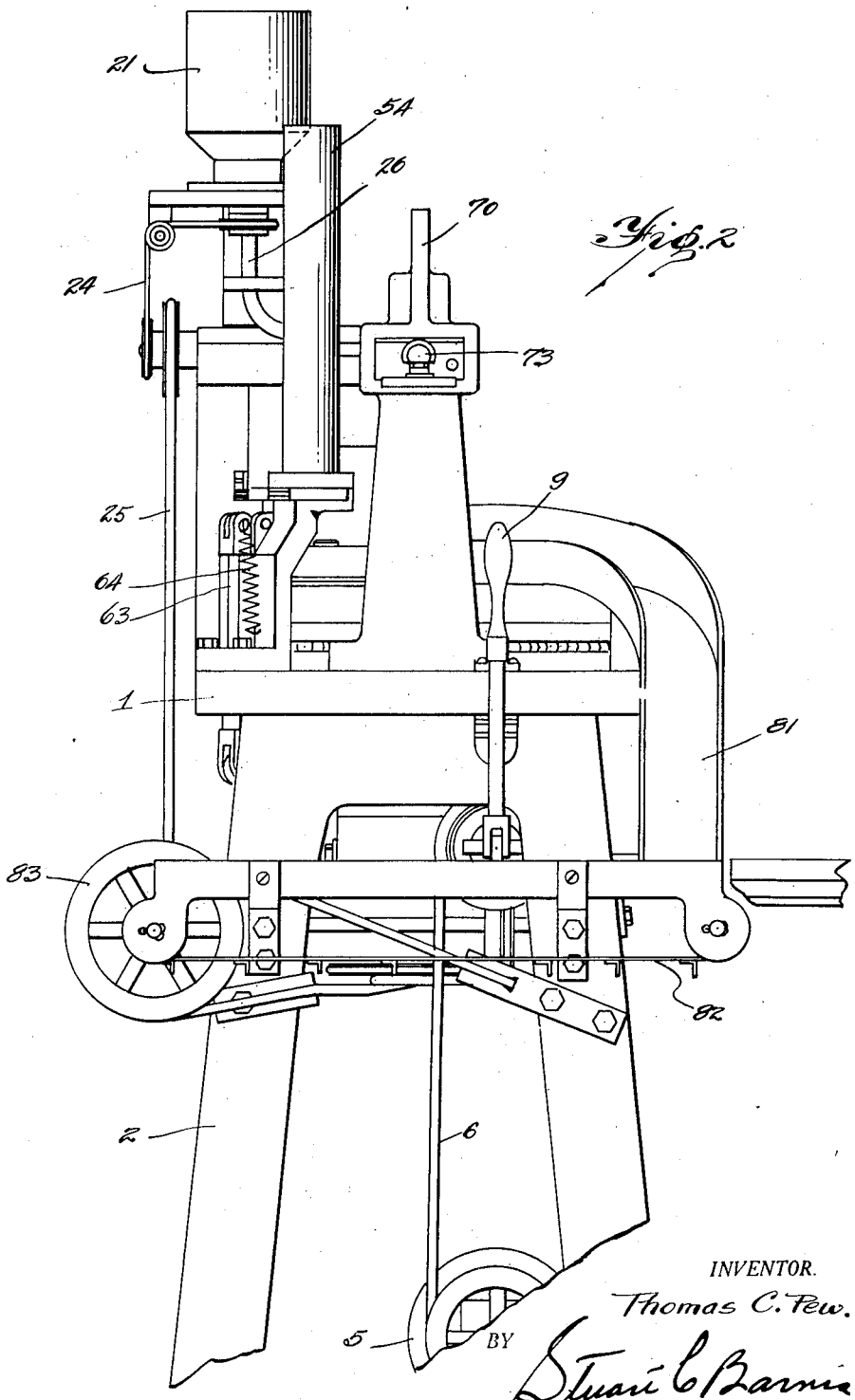

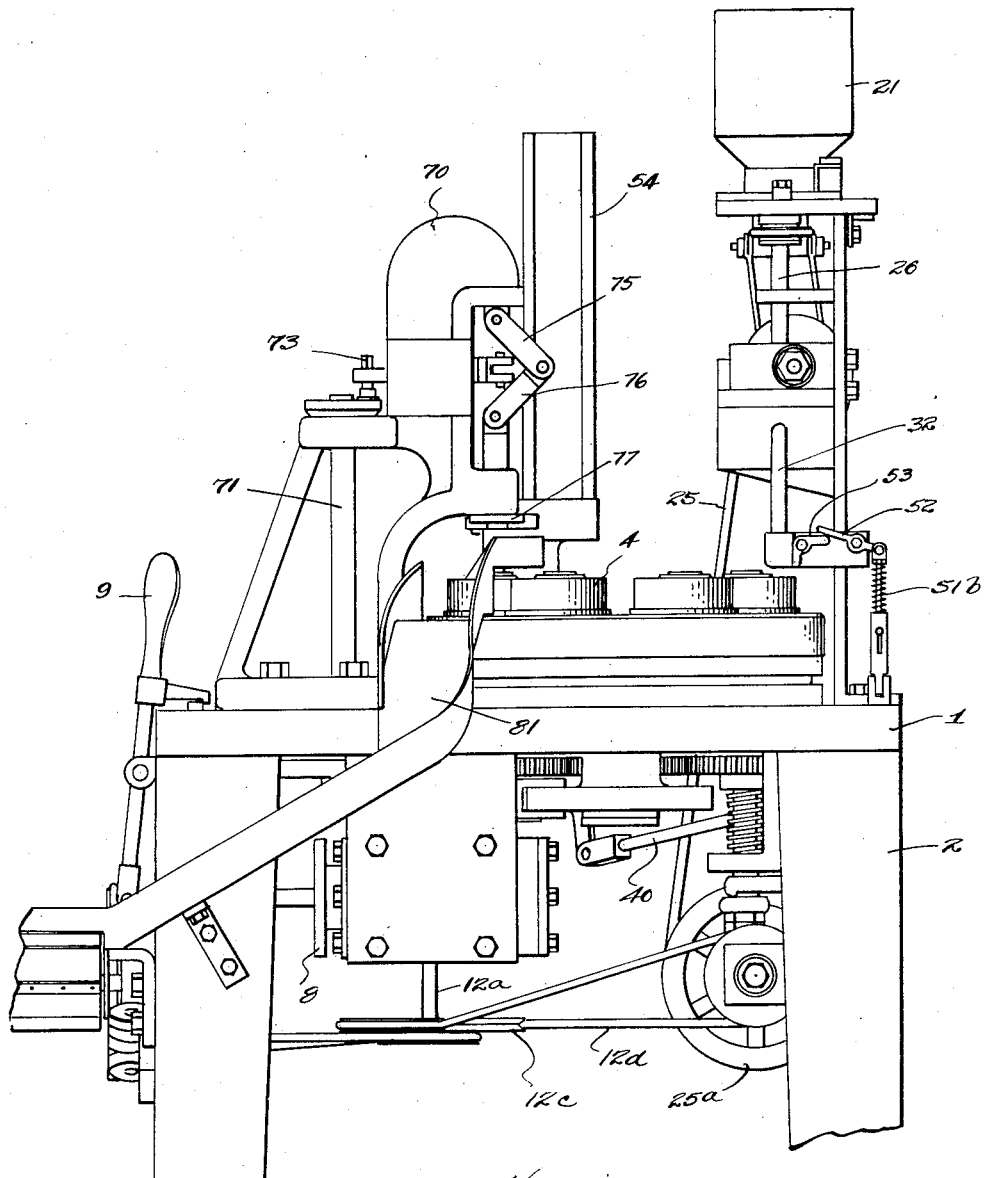

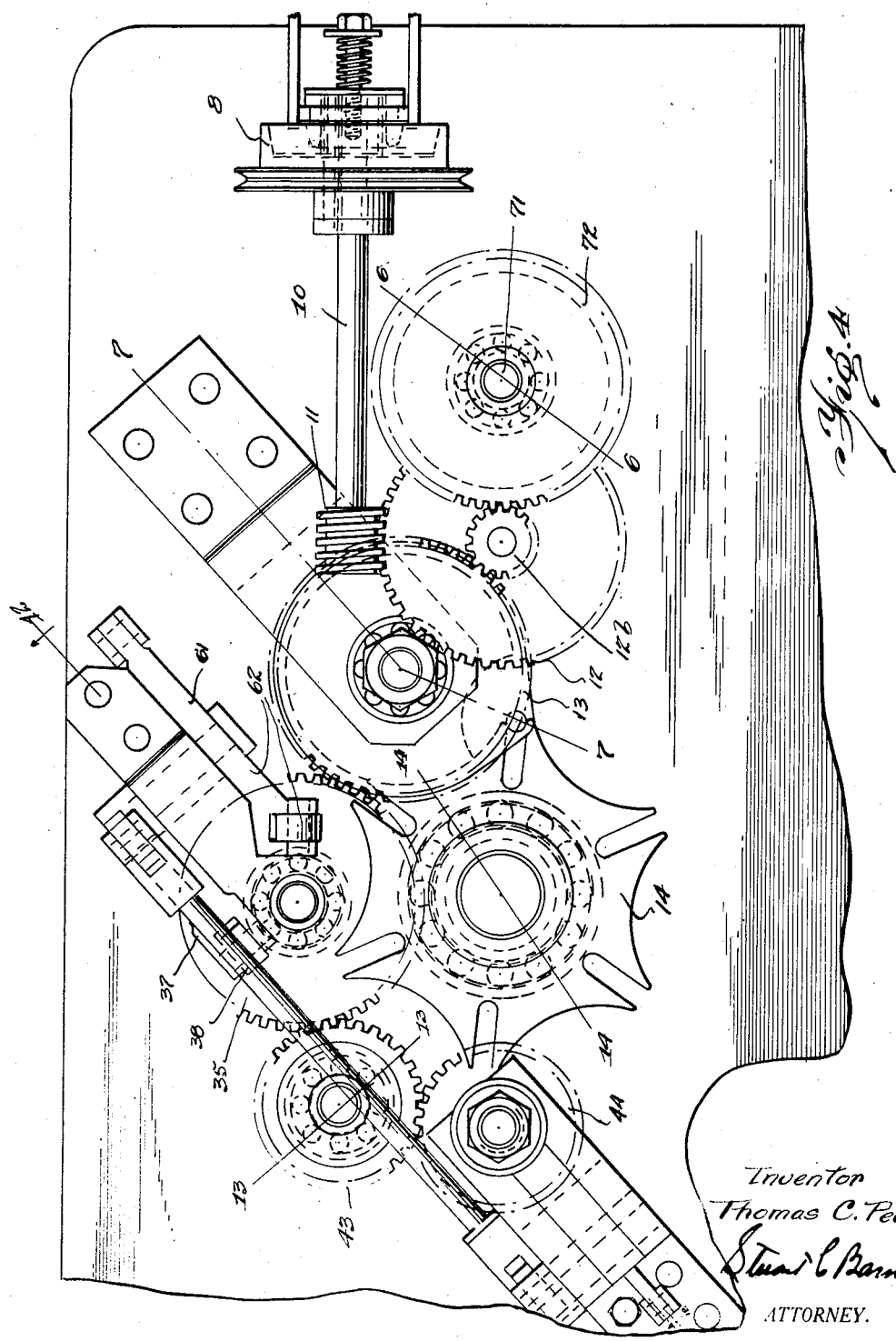

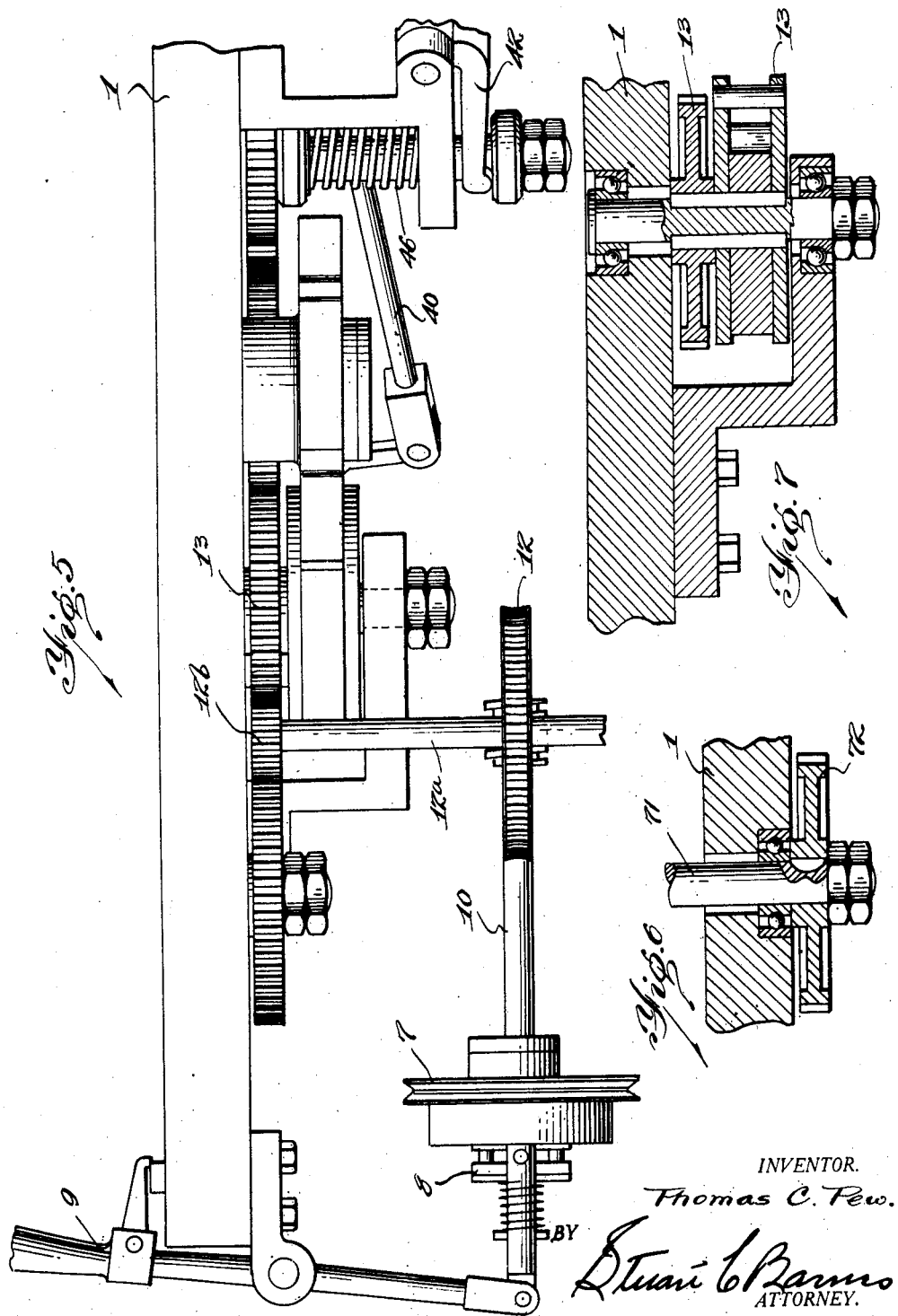

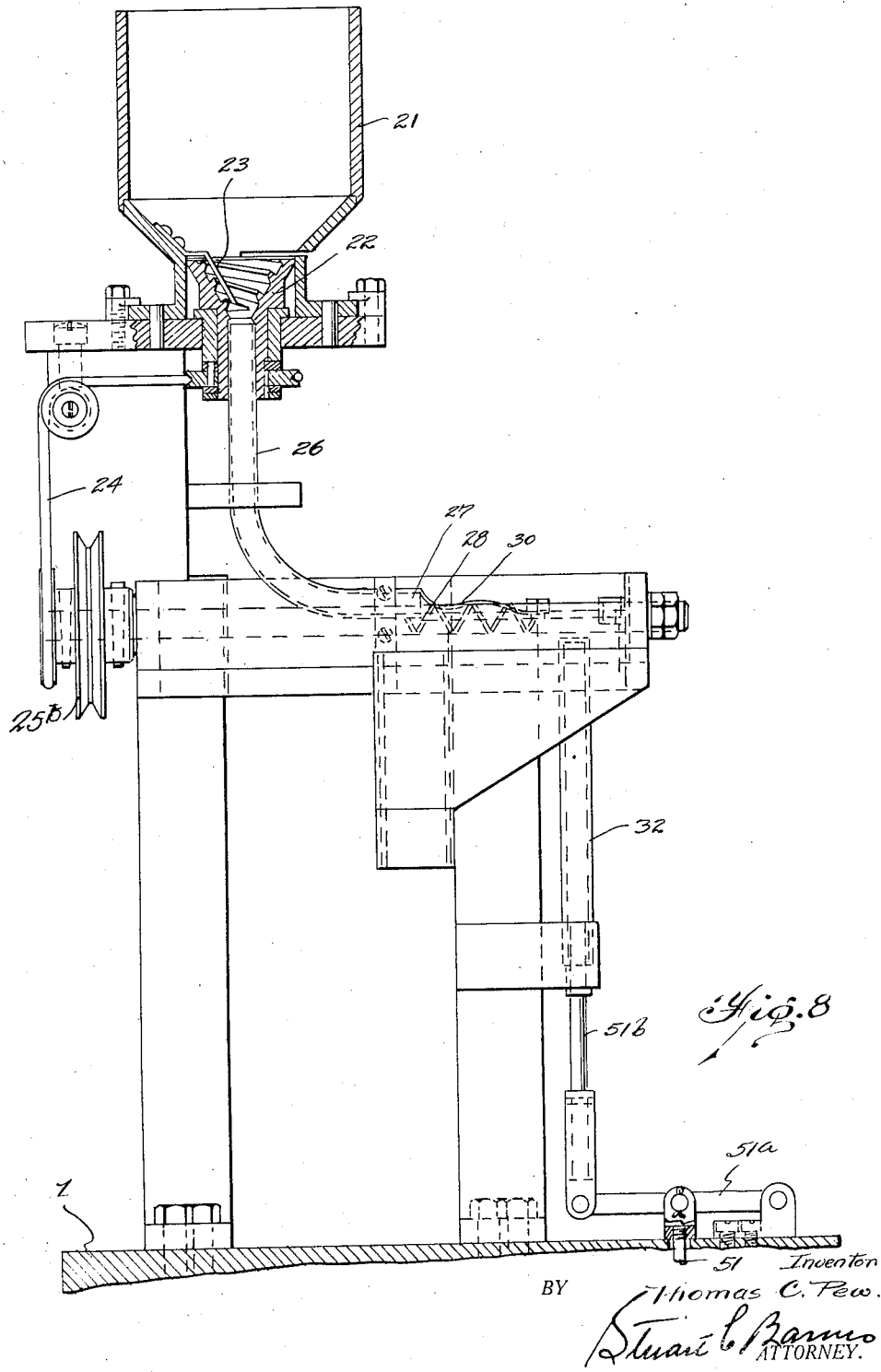

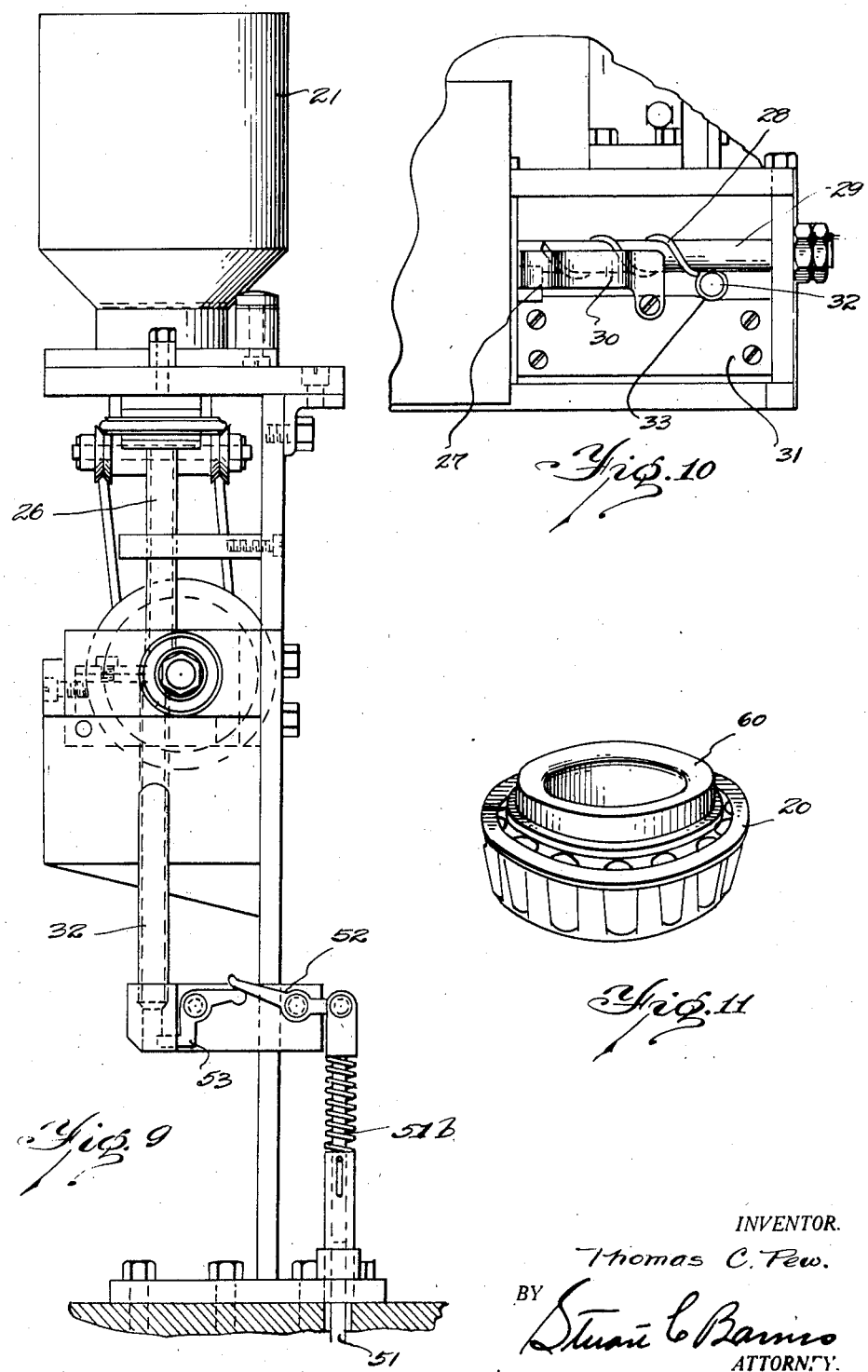

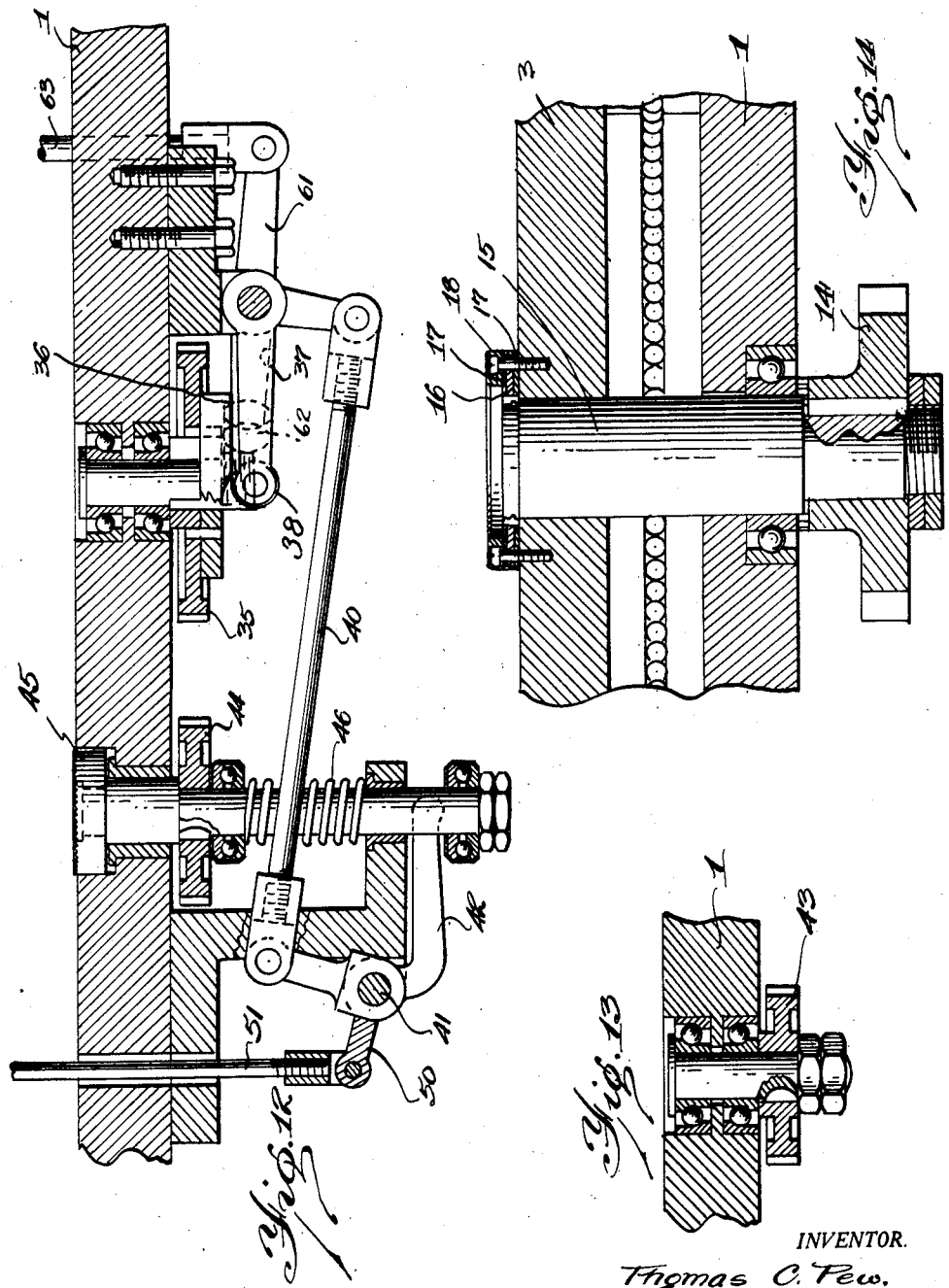

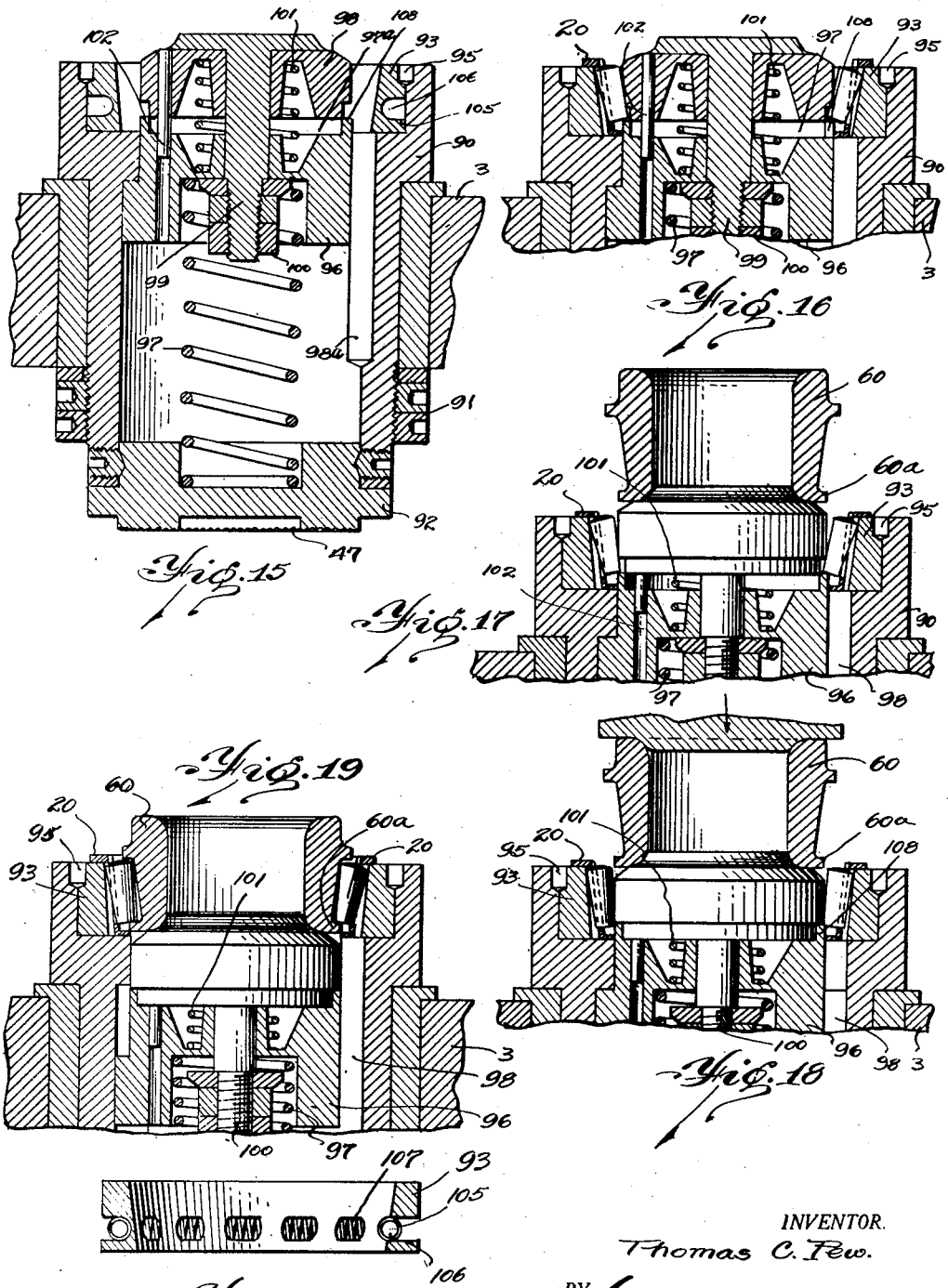

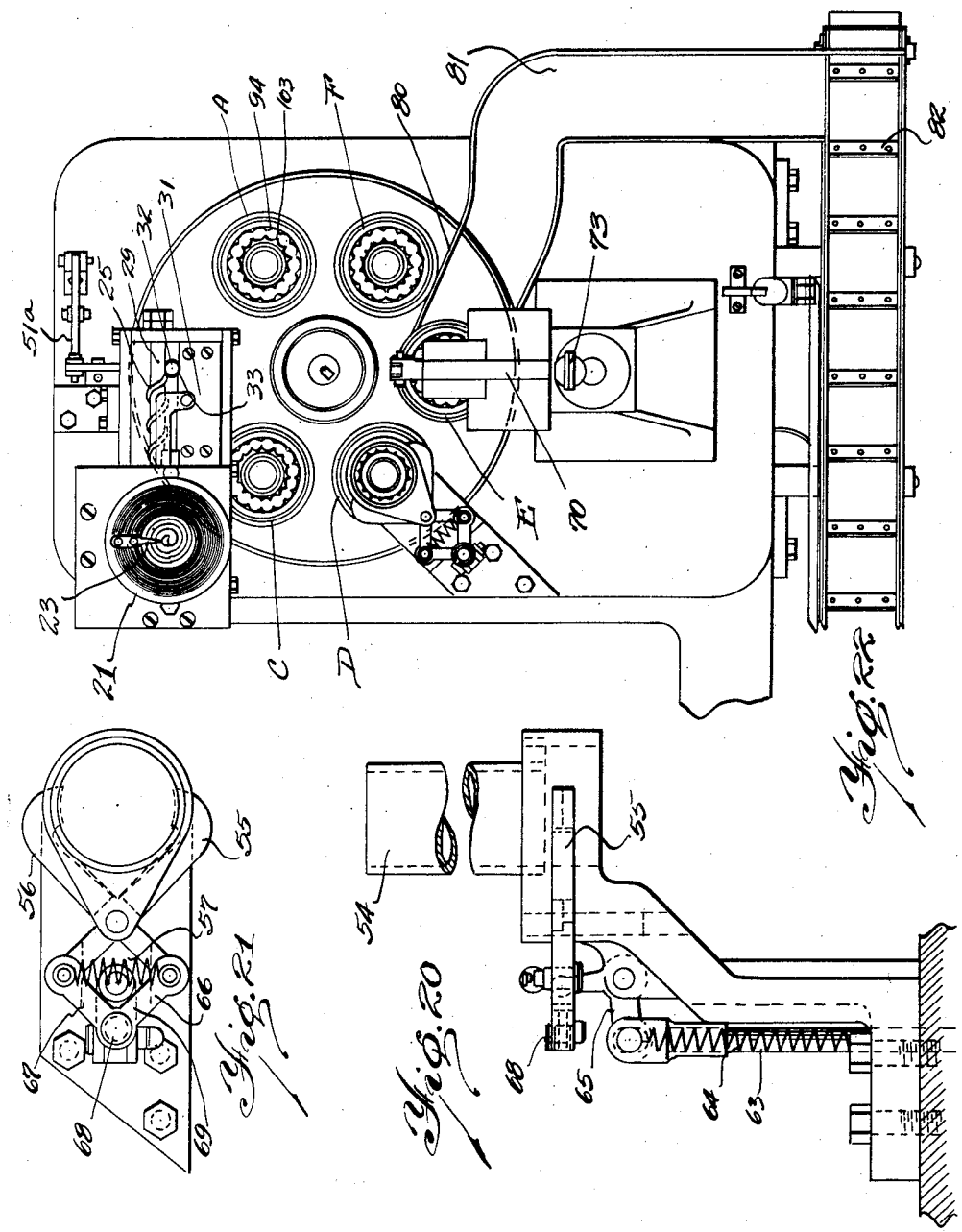

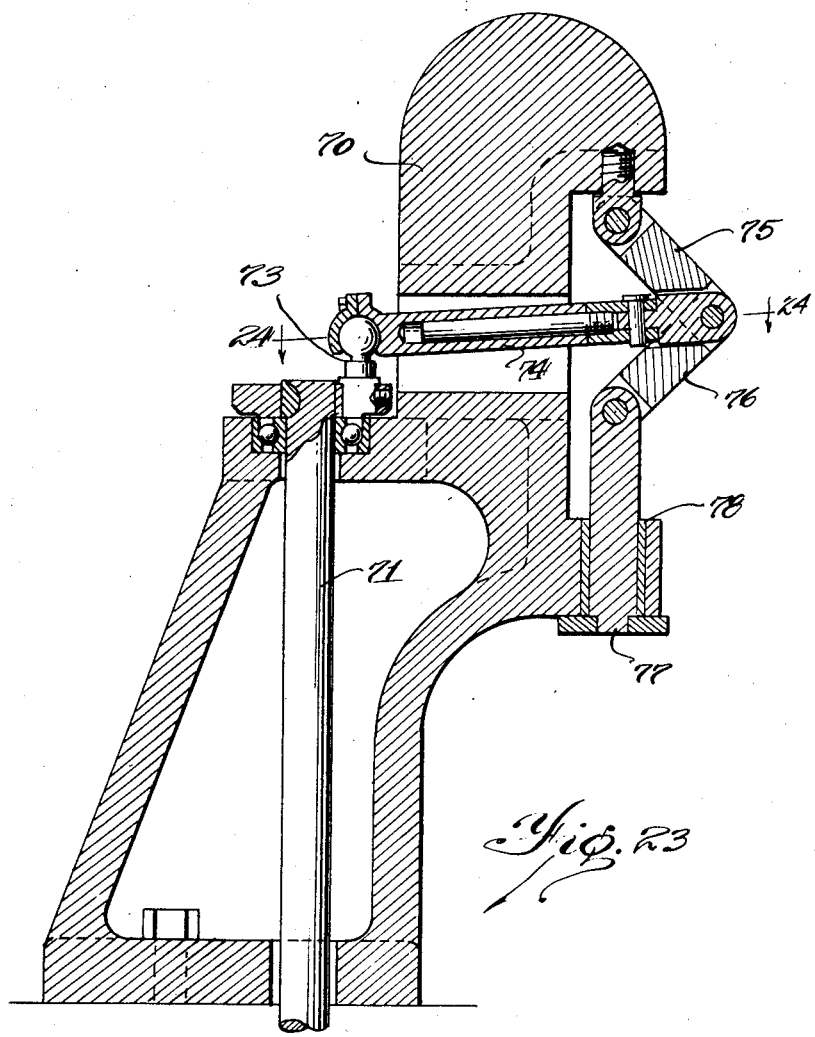
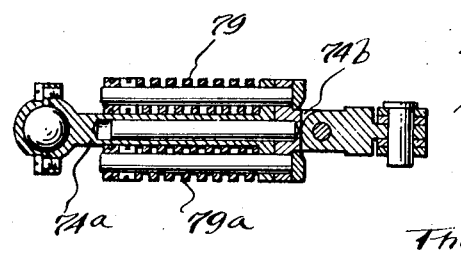

1,723,369

UNITED STATES PATENT OFFICE.

THOMAS C. PEW, OF ANN ARBOR, MICHIGAN, ASSIGNOR TO HOOVER STEEL BALL COMPANY, OF ANN ARBOR, MICHIGAN, A CORPORATION OF MICHIGAN.

APPARATUS FOR ASSEMBLING BEARINGS.

Application filed September 29, 1927. Serial No. 222,777.

The subject matter of this invention is an apparatus for assembling bearings, with special reference to an apparatus for automatically assembling roller bearings which consist of a multiplicity of rollers, a retainer for the rollers, and a bearing member for the rollers commonly termed a cone.

It has been the practice to assemble bearings by hand. In assembling a bearing by hand, a person takes a retainer and places, by hand, a requisite number of rollers in the container, and then by hand, puts the bearing or cone within the rollers. The final operation consists in forcing the cone into position by pressure, in which operation the slight amount of resiliency in the retainer comes into play whereby the parts are finally secured together with a snap. The invention contemplates a machine for performing the assembling operations automatically, which machine, with but one operator, is capable of assembling bearings faster than several persons assembling bearings by hand.

In the accompanying drawings:

Fig. 1 is a perspective view of a machine with the lower portion of the support for the machine and the source of power omitted.

Fig. 2 is a side elevation of the machine, looking approximately from the left hand side of Fig. 1.

Fig. 3 is a side elevation of the machine taken at right angles to the view of Fig. 2.

Fig. 4 is a plan view of a lower portion of the support for the machine showing the gearing arrangement and Geneva movement.

Fig. 5 is a view showing the clutch construction and driving connections for the machine.

Fig. 6 is a detail view in section taken on line 6—6 of Fig. 4.

Fig. 7 is a detail view taken in section on line 7—7 of Fig. 4.

Fig. 8 is a view partly in section showing the hopper and the feed mechanism for the rollers.

Fig. 9 is a side elevation of the feed mechanism for the rollers looking at the right hand side of Fig. 8 showing the mechanism for controlling the feed of the rollers.

Fig. 10 is an enlarged plan view showing part of the roller feed mechanism.

Fig. 11 is a perspective view of a roller bearing which the machine is adapted to assemble.

Fig. 12 is a sectional view taken on line 12—12 of Fig. 4 showing mechanism for controlling some of the timed operations of the machinery.

Fig. 13 is a detail in section taken on line 13—13 of Fig. 4.

Fig. 14 is a sectional view on line 14—14 of Fig. 4 showing the Geneva drive and the friction driving connection with the table of the machine.

Fig. 15 is a sectional view taken through one of the units for the bearings, several of which are carried by the table of the machine, and showing the details of construction of this unit.

Fig. 16 is a sectional view showing this unit with a bearing retainer in place, and the manner in which the rollers are placed in the container prior to the placing of the cone therein.

Fig. 17 is a view similar to Fig. 16 showing the cone placed on the machine ready to be inserted within the rollers and container therefor.

Fig. 18 is a view showing the position of the parts in the first step of assembling the cone within the retainer.

Fig. 19 shows the parts in finally assembled position.

Fig. 20 is a detail view showing the feed mechanism for the cones.

Fig. 21 is a plan view of the control for the cone feed mechanism.

Fig. 22 is a plan view of the machine showing especially the cone feed construction, the hopper, and roller feed device.

Fig. 23 is a sectional view in detail showing the assembly press for forcing the cone into the retainer with the rollers therein.

Fig. 24 is a sectional view taken on line 24—24 of Fig. 23 showing the spring connecting member for operating the assembly press.

Fig. 25 is a detail view of the ring of the unit showing the manner in which the circular coil spring is placed in the ring for acting upon the rollers when initially inserted in a unit.

The apparatus is preferably placed on a support 1 having suitable legs 2. Rotatably mounted on the support is a table 3 preferably mounted on ball bearings, as shown; and this table carries a plurality of container units 4, there being six of such units shown in the present machine. The primary operating action of the machine is an intermittent step-by-step movement of the table 3, whereby a given unit assumes a different position in each step. Different operations are performed in some of the different positions. Power for operating the machine may be afforded by an electric motor 5 with a belt 6 operating over a pulley 7 (Fig. 5). The machine may be controlled by a suitable clutch 8 having an operating handle 9. The pulley 7 is mounted on a shaft 10 (Figs. 4 and 5) having a worm 11 associated with a gear 12 mounted in shaft 12$^a$ which in turn actuates a rotating member 13 of a Geneva movement through gear 12$^b$, the intermittently moving part being shown at 14. By referring to Fig. 14 it will be seen that the table 3 is connected to the geneva by a shaft 15 having a driving plate 16. On either side of this driving plate 16 is a frictional driving washer 17 preferably of a fibrous material, and the driving plate is clamped between these washers by a cover ring 18, and screws therefor fitting into the table. This drive connection is sufficiently tight to drive the table under all normal conditions, but when an abnormal condition exists, as for instance the catching of a roller in the mechanism, the driving connection slips to prevent damage to the parts.

The details of the various operating mechanisms, it is thought, can be best described by following one unit on the table through its cycle of movement. For this purpose we will take the unit in position A (Figs. 1 and 22). An operator stands near the machine and when the unit is in position A, or thereabouts, inserts in the unit a retainer 20, as shown in Fig. 16. The next intermittent movement of the table places this unit in position B, and in this position the rollers are automatically fed into the unit and in proper position with respect to the retainer.

The hopper for the rollers is shown at 21 (Figs. 1, 8 and 9). The operator keeps the hopper supplied with the rollers. The bottom of the hopper is cone shaped and has fitted therein a rotating internally wormed member 22. A fixed finger 23 extends into this wormed member. This wormed member is rotated by a suitable belt 24 which in turn is actuated by a belt 25 running over a pulley wheel 25$^a$ and 25$^b$ (Figs. 3 and 8). A pulley 12$^c$ mounted on shaft 12$^a$ has a belt connection 12$^d$ for driving pulley 25$^a$.

The supply of rollers in the hopper is continuously agitated by the rotation of the member 22, the member 23 acting to prevent the body of rollers from moving with the member. The rollers are accordingly caused to be fed in a lengthwise direction through a tube 26. This tube is curved, as shown, and the rollers pass out the end 27 of the tube where they are engaged by a helical rib 28 on shaft 29 which is rotated by the belt 25. A flat spring 30 contacts with the shaft 29, and this flat spring is raised as a portion of the helical rib passes thereunder, thus to permit the passage of one roller. As shown in Fig. 10, there is a guide 31 spaced from the shaft 29, and the distance between the edge of the guide and the shaft is such as to permit the small end of the rollers to drop downwardly with the upper portion of the rollers engaged. In this position the rollers are advanced as the shaft turns. Accordingly it is not material which end of the rollers is forward as they drop through the tube 26. A feed pipe 32 has an open end positioned between the guide and shaft, and the guide is shaped to enlarge somewhat at 33 to permit the rollers to drop into the feed pipe. This feed pipe is positioned just above the unit at position B so as to drop the rollers into the unit.

When a unit is in position B it is rotated substantially one revolution so that the rollers fall through the feed pipe 32 and the requisite number of rollers are placed in the unit. For this purpose there is a gear 35 (Figs. 4 and 12) provided with a cam surface 36. A bell crank 37 has a roller 38 which contacts with this idler gear and which is actuated by the cam. Connected to this bell crank is a rod 40 for rocking shaft 41, and on this shaft is an arm 42. An idler gear 43 meshes with gear 35 and with gear 44 which constantly rotates member 45 provided with ratchet teeth. A coil spring 46 normally raises the ratchet member 45 upwardly with respect to the support 1 so that it engages ratchet teeth 47 (Fig. 15) on the unit. Thus while the intermittently moving table is at a position of rest the unit at position B is rotated; when, however, the table moves, the cam 36 operates through the connections described to retract the ratchet member 45 to disengage it from the unit. When another unit is brought to position B the member 45 moves upwardly and engages that unit to rotate the same. These actions are in timed relation to the intermittent movement of the table.

The rollers in the feed chute are fed into the unit during rotation thereof, but at the time of movement of the table the feed of the rollers is stopped. This construction is shown in Figs. 8, 9 and 12. An arm 50 is connected to the rock shaft 41 and a rod 51 is connected to the arm. The action of the cam upon the bell crank 37 effects an upward lift on the rod 51 which rocks the arm 51$^a$ (Fig. 8) which in turn raises rod 51$^b$ which again in turn rocks the arm 52 (Fig. 9) to rock a feed control latch member 53, the end of which moves into a position to stop the flow of rollers. This action occurs when the intermittently moving table is moving and the rollers are permitted to feed during substantially all the time that a given unit is in position B.

There are certain structural features of each unit which have to do with the proper positioning of the rollers in the unit as they are fed into the unit while in position B. These details of construction will be skipped over for the present and the description will proceed in accordance with the steps of the intermittently moving table.

The next movement of the table places the unit in position C (Figs. 1 and 22). This is an idle position for inspection to see that all the rolls are in place and in the right position to let the cone enter. The following step places the unit in position D. At this point a cone is placed in proper position with respect to the unit. A magazine 54 contains a supply of cones, and this magazine is kept supplied by the operator. These cones are retained in the magazine by a pair of pivoted tong-like members 55 and 56, the ends of which project through suitable openings in the magazine. The ends of the tongs are normally kept in engagement with the lowermost cone by a tension spring 57. In proper timed relation to the intermittent movement of the table, the tongs are opened to permit the cones in the magazine to drop, thus to position the lowermost cone 60 on a unit substantially in a manner shown in Fig. 17.

For the purpose of opening these members a pivot arm 61 has a roller 62 which is engaged by the cam 36 on the gear 35 (Figs. 4 and 12). The action of the cam is to rock the arm 61 and raise the rod 63 against the action of a spring 64 (Fig. 20). The end of the rod 63 is connected to a bell crank 65. The operating ends of the members 55 and 56 are provided with pivoted links 66 and 67 connected together as at 68. The opposite end of the bell crank 63 is connected to the joint 68 by a suitable link 69. It will be observed that upon upward movement of the rod 63 the pivot point 68 is moved from left to right, as viewed in Fig. 21, thus stretching the spring 57 and opening the retaining members 55 and 56. This operation takes place at a suitable period while the table is standing stationary between its intermittent movements.

The next movement of the table places the unit in position E, the unit carrying with it the cone 60. In this position E the cone is forced downwardly within the rollers with an action, which is depicted in Figs. 18 and 19, by a suitable pressing mechanism. This mechanism consists of a suitable head 70 (Fig. 23). A shaft 71 extends upwardly near the head and is rotated by a gear 72, the movement to which is imparted from the gear 12$^b$ (Figs. 4 and 6). A crank 73 is actuated by this shaft and the crank is connected by a connecting link 74 to a toggle lever arrangement consisting of levers 75 and 76. One end of the lever 75 is fixed, whereas the lever 76 is pivoted to a pressure member 77 slidably guided, as at 78. The shaft 71 rotates in timed relation to the movement of the table so that the presser member is actuated once with each movement of the table. With reference to Fig. 24, it will be noted that the connecting member 74 consists of two cooperating parts 74$^a$ and 74$^b$ with interposed compression springs 79 and 79$^a$. If for any reason the cone is blocked from entering the unit as by means of a misplaced roller, these springs will give and prevent breakage of any of the parts.

As the presser head returns to its raised position the completed bearing is projected upwardly by the unit by mechanism soon to be described so that the entire bearing is supported in a position corresponding to the position of the cone in Fig. 17. In the next movement of the table the unit carrying this bearing with it, is moved to position F (Figs. 1 and 22). As the unit passes from position E to position F the bearing carried thereby is engaged by a guard 80 and is removed from the unit. This guard 80 in reality forms a part of a chute 81, and the completed bearing slides down the chute and is removed from the machine. The chute or slide 81 may guide the finished bearings onto an endless conveyor belt 82, operated by a pulley 83.

The general operation of the machine is believed to be now understood. Briefly reiterating, however, an operator stands at the machine at approximately the position of one when viewing Fig. 1 of the drawings. Each time a unit comes to position A, or thereabouts, the operator places a retainer in the unit. The table then moves to position at B where the unit is rotated and the rollers are fed into the retainer. Two more movements of the table are required to place the unit at position D where a cone is delivered to the unit. The next movement of the machine places the unit at position E where the presser head acts to press the cone into the retainer and rollers. The next movement of the table causes the finished bearing to slide down the chute and over to the conveyor. The operator keeps the hopper 21 supplied with rollers and the magazine 54 supplied with cones. A suitable counter 85 may be placed on the machine, as for instance, on the presser head, and connected to the presser head, as at 86, so that each time a bearing is completed the same is recorded.

The details of the construction of each unit, and the manner in which the rollers are received and held prior to the placing of the cone therein, and the manner in which the construction of the unit aids in the assembling operation is depicted in Figs. 15 to 19, inclusive, and Fig. 25. Each unit consists of a sleeve-like member 90 rotatably mounted on the table 3, locked in place by nuts 91, and having a bottom part 92 provided with serrations. Within this sleeve-like member is a ring-like member 93 which is serrated or grooved, as at 94 (Fig. 22), for receiving the rollers. This ring-like member is keyed to the sleeve 90 by a key 95.

Slidably mounted within the sleeve 90 is a member 96 normally urged upwardly by a compression spring 97, the member being keyed to the sleeve so that it can not rotate with respect to the sleeve, as shown at 98ᵃ. The member 96 is recessed, as at 97ᵃ for receiving a cone supporting member 98 which includes a part having a screw threaded projection 99 which receives nuts 100 for fixing the two parts together. Coil spring 101, which is disposed between the parts 96 and 98, is a compression spring and serves to keep the parts normally separated, but the spring is of less strength than compression spring 97. These two members are keyed together, as at 102, to prevent relative rotation. The member 98 is serrated or provided with grooves 103 (Fig. 22) positioned in opposition to the grooves in the ring-member 93 to complete the provision for the rollers.

As the machine operates the retainer 20 of the bearing is placed in the unit in the position shown in Fig. 16, and then as the unit is rotated the rollers are dropped into the spaces provided therefor by the grooved portions of the unit. It is necessary that these rollers take a position which will permit the entrance of the cone. For this purpose the ring 93 may be provided with a circumferential groove 105 containing a coil spring 106 with the ring cut away at the grooved portions, as at 107. This permits the exposure of the circular coil spring so that it contacts with the rollers, as shown in Fig. 25. This insures that all of the rollers assume an outwardly tipped position with the bottom of the rollers resting on the shoulder 108 of the part 96.

However, it has been found in practice that this coil spring construction can be dispensed with inasmuch as the rollers will assume this outwardly tipped position without the use of the spring, as depicted in Fig. 16. After all the rollers are in place and the unit is positioned underneath the cone magazine, a cone is positioned as shown in Fig. 17. Note that due to the tipped position of the rollers in Fig. 17 that the lower flange 60ᵃ of the cone is free to enter between the rollers.

The next operation is that of the presser head forcing the cone into position. The first action of this operation is shown in Fig. 18, and due to the fact that the spring 97 is stronger than the spring 101, the part 98 is first moved downwardly against the part 96, as shown in Fig. 18. This movement permits the flange 60ᵃ to move within the circle formed by the rollers, and immediately following this the rollers are pushed off the shoulder 108 so that they assume practically their normal position. Further downward movement of the presser head causes the shoulder 60ᵃ to squeeze in between the ring formed by the rollers, and in final position the flange snaps in under the lowermost edges of the rollers. This snapping action is permitted by the resiliency of the retainer ring and is the usual manner of assembling the bearings by hand. The final assembled position is shown in Fig. 19. During this operation the part 96 is moved downwardly and the spring 97 compressed. When the presser head rises, the spring 97 and the spring 101 both expand and return to their original position, as shown in Fig. 15, thus ejecting the completed bearing and permitting the same to rest on the unit in the position of the cone shown in Fig. 17. It remains only to remove the completed bearing, which is accomplished by the guard 80 which sweeps the bearing off the unit as the table moves, all of which has been above described.

Thus the invention affords an apparatus for the assembling of the bearings, and the apparatus has a capacity greater than the total capacity of several operatives assembling bearings by hand, but at the same time requiring only one operator. Provision is not only made for positioning of the rollers and assembling of the rollers in their retainer and cone, but provision is also made for abnormal conditions. These have been above described and consist of the friction drive for the intermittently moving table, and a spring connection for the presser head. Preferably, the feed mechanism for the rollers which consists of the hopper and agitating mechanism, and the helically shouldered shaft is set to operate a little fast to insure the feeding of a sufficient number of rollers. If at any time too many rollers are fed, the feed pipe 32 merely fills up with rollers and the excess rollers are deposited on and around the gauge 31 (Fig. 10) and may be removed from time to time by the operator and replaced in the hopper.

Claims:

1. A roller bearing assembling machine, comprising in combination, means for receiving a bearing retainer, means for feeding roller bearing members to the retainer with each bearing member properly positioned in the retainer and for positioning a cone with respect to the roller bearing members and their retainer.

2. A roller bearing assembling machine, comprising in combination, means for receiving a cage like roller bearing retainer, means for feeding roller bearing members to the retainer and for positioning the rollers in the cage like retainer, means for feeding a cone, and means for assembling the cone within the retainer and bearing members.

3. A bearing assembling machine for bearings consisting of roller bearing members with a cage retainer device and cone device therefor, comprising in combination, means for automatically feeding the bearing members to one of the first mentioned devices, means for feeding the other of the other mentioned devices with each roller properly positioned in the cage retainer, and means for assembling the devices in proper relation with the bearing members.

4. A bearing assembling machine, comprising in combination, a table, means for rotating the table with an intermittent movement, a unit on the table and a plurality of means positioned at various points, substantially at the positions of rest of the unit between intermittent movements of the table for feeding bearing parts to the unit and for assembling the parts.

5. A bearing assembling machine, comprising in combination a table, means for rotating the table with intermittent movement, a unit carried by the table adapted to receive a member of the bearing, means positioned at a station of rest of the unit for feeding bearing members to the unit, means positioned at another station of rest of the unit for feeding another bearing member to the unit, means positioned at another station of rest of the unit for positioning the said two bearing members with respect to the bearing members.

6. A bearing assembling machine, comprising in combination a table, means for rotating the table with intermittent movement, a unit carried by the table adapted to receive a member of the bearing, means positioned at a station of rest of the unit for feeding bearing members to the unit, means positioned at another station of rest of the unit for feeding another bearing member to the unit, means positioned at another station of rest of the unit for positioning the said two bearing members with respect to the bearing members, and means for removing the assembled bearing from the table.

7. A bearing assembling machine comprising in combination, a table, means for rotating the table with intermittent movement, a pluarlity of units on the table for receiving a bearing retainer, means placed at a position of rest of the units for feeding rollers to the unit and bearing retainer therein, means placed at another position of rest of the units for feeding a cone to each unit, and means positioned at another station of rest for assembling the parts thus fed to the unit.

8. A bearing assembling machine comprising in combination, a table, means for rotating the table with intermittent movement, a plurality of units on the table for receiving a bearing retainer, means placed at a position of rest of the units for feeding rollers to the unit and bearing retainer therein, means placed at another position of rest of the units for feeding a cone to each unit, and means positioned at another station of rest for assembling the parts thus fed to the unit, and means for removing the assembled bearing from the table.

9. A machine for assembling roller bearings which consist of rollers, a retainer therefor, and a cone therefor, comprising in combination a table and means for rotating the table with intermittent movement, a plurality of units on the table adapted to receive a bearing retainer, a plurality of means positioned at stations of rest for feeding rollers to the units and for feeding a cone to the units, and means positioned at another station of rest for assembling the parts of the bearing.

10. A roller feeding mechanism for a bearing assembling machine or the like, comprising a hopper for the rollers, an outlet in the bottom of the hopper, an internally roughened agitating member forming a portion of the bottom of the hopper, and means for actuating this member.

11. A feeding device for roller bearings for a bearing assembling machine or the like, comprising a hopper for the bearings with a restricted bottom portion, an outlet in this restricted portion for the bearings, a substantially cone shaped internally threaded member positioned adjacent the outlet and through which the rollers pass, and means for rotating this internally threaded agitating member.

12. A feeding device for roller bearings for a bearing assembling machine or the like comprising a hopper for the bearings with a restricted bottom portion, an outlet in this restricted portion for the bearings, a substantially cone shaped internally threaded member positioned adjacent the outlet and through which the rollers pass, means for rotating this internally threaded agitating member, and a stationary finger-like member within the agitating member.

13. A feeding mechanism for tapered rollers for a bearing assembling machine or the like, comprising means for feeding the rollers in succession, and means consisting of a rotating shaft having a helical rib thereon with a guide member spaced from the shaft for receiving the rollers thus fed, the distance between the guide and the shaft being such as to permit the small ends of the rollers to hang downwardly.

14. A feeding mechanism for tapered rollers for a bearing assembling machine or the like, comprising means for feeding the rollers in succession, and means consisting of a rotating shaft having a helical rib thereon with a guide member spaced from the shaft for receiving the rollers thus fed, the distance between the guide and the shaft being such as to permit the small ends of the rollers to hang downwardly, said guide being shaped to afford an increased distance between the edge of the guide and the shaft at a given point to effect release of the rollers.

15. A feeding mechanism for tapered rollers for a bearing assembling machine or the like, comprising means for feeding the rollers in succession, and means consisting of a rotating shaft having a helical rib thereon with a guide member spaced from the shaft for receiving the rollers thus fed, the distance between the guide and the shaft being such as to permit the small ends of the rollers to hang downwardly, said guide being shaped to afford an increased distance between the edge of the guide and the shaft at a given point to effect release of the rollers, and means for receiving the rollers thus released.

16. A feeding mechanism for tapered rollers for a bearing assembling machine or the like, comprising means for feeding the rollers in succession, and means consisting of a rotating shaft having a helical rib thereon with a guide member spaced from the shaft for receiving the rollers thus fed, the distance between the guide and the shaft being such as to allow the small ends of the rollers to hang downwardly, said guide being shaped to afford an increased distance between the edge of the guide and the shaft at a given point to effect release of the rollers, a conduit member into which the rollers drop as thus released, and means operable adjacent one end of this conduit for feeding the properly positioned rollers out of said conduit.

17. In a bearing assembling machine, the combination of means for receiving a bearing retainer, said means being provided with suitable spaces for receiving the bearing members, means for receiving a cone for the bearing, this last mentioned means holding the cone above the retainer and being movable with respect to the retainer, and means for moving the cone and its holding means to assemble the cone within the retainer and bearing members.

18. In a bearing assembling meachine, the combination of a receiving member for receiving a bearing retainer, a depressible member within this receiving member for supporting a cone, there being a space between these two members for the reception of the bearing members, and means for depressing the cone to position it in assembled relation with respect to the bearing members and retainer.

19. In a bearing assembling machine the combination of a receiving member for holding a retainer and provided with spaces for receiving bearings adjacent the retainer, means for holding these bearings in an outwardly tipped position and means for inserting a cone within the bearings while they are in this outwardly tipped position.

20. In a bearing assembling machine the combination of a receiving member for holding a retainer and provided with spaces for receiving bearings adjacent the retainer, means for holding these bearings in an outwardly tipped position, means for inserting a cone within the bearings while they are in this outwardly tipped position, said bearing being supported so that they automatically assume substantially a normal position with respect to the retainer upon insertion of the cone.

21. In a bearing assembling machine, the combination of a receiving member for a bearing retainer, a central portion for this receiver member which affords spaces for receiving roller bearings, this central portion being normally spring pressed and being adapted to receive a cone, means on the central portion for supporting the roller bearings in an outwardly and upwardly tipped relation to permit entrance of the cone, means for depressing the central portion and cone, whereby the core enters within the space between the rollers to cause them to assume substantially normal position upon the depressing of the central portion.

22. In a bearing assembling machine, the combination of a receiver member for receiving a retainer, a spring pressed central portion spaced from the receiver to provide for the reception of roller bearings, said central portion being in two parts which are normally separated to provide a shoulder upon which the bearings initially rest whereby they are held in outwardly tipped position, said central portion being adapted to receive a cone, means for depressing the cone and a part of the central portion whereby the two parts of the central portion come together to permit the rollers to assume substantially normal position, and whereby upon further movement the entire central portion is depressed and the cone is assembled with the retainer and bearings.

23. In a bearing assembling machine, the combination of a receiver member for receiving a retainer, a spring pressed central portion spaced from the receiver to provide for the reception of roller bearings, said central portion being in two parts that are normally separated to provide a shoulder upon which the bearings initially rest whereby they are held in outwardly tipped position, said central portion being adapted to receive a cone, means for depressing the cone and part of the central portion whereby the two parts of the central portion come together to permit the rollers to assume substantially normal position, and whereby upon further movement the central portion is depressed and the cone is assembled with the retainer and bearings, and spring means for holding bearings on the said shoulder whereby to insure their outwardly and upwardly tipped position.

24. In a roller bearing assembling machine, the combination of a receiver member for receiving a retainer and rollers, and means for inserting a cone, said receiver member including a ring-like member surrounding the retainer, said ring-like member being cut away at points adjacent the rollers, and spring means extending through the cut-away portions to contact with and hold the rollers in tipped relation prior to the insertion of the cone, but which give way to permit normal positioning of the rollers upon insertion of the cone.

25. In a roller bearing assembling apparatus, means for receiving a bearing retainer and rollers, and means for inserting a cone, and resilient means acting upon the rollers to hold them in an abnormal position prior to the insertion of the cone, but which permits normal positioning of the rollers upon insertion of the cone.

26. In a roller bearing assembling apparatus, means for receiving a roller retainer and a plurality of rollers, said means including a ring surrounding the retainer which is cut away at points adjacent the rollers, a coil spring around this ring which projects through the cut away portions to contact with the rollers and cause them to assume a tipped position, means for inserting a cone, said coil spring permitting the rollers to assume a normal position with respect to the cone and retainer upon insertion of the cone.

27. A bearing assembling machine, comprising a table, means for moving the table with intermittent movement, a plurality of units on the table which are alternately at positions of rest in accordance with the intermittent movement of the table, a plurality of means stationed at positions of rest for feeding parts of a bearing to the units, a portion of each unit being spring pressed normally upwardly, a presser head stationed at one of the positions of rest which actuates in timed relation to the intermittent movements of the table to press the bearing parts together and complete the assemblage, said spring pressed unit projecting the assembled bearing upwardly upon the raising of the presser head.

28. A bearing assembling machine, comprising a table, means for moving the table with intermittent movement, a plurality of units on the table which are alternately at positions of rest in accordance with the intermittent movement of the table, a plurality of means stationed at positions of rest for feeding parts of a bearing to the units, a portion of each unit being spring pressed normally upwardly, a presser head stationed at one of the positions of rest which actuates in timed relation to the intermittent movements of the table to press the bearing parts together and complete the assemblage, said spring pressed unit projecting the assembled bearing upwardly upon the raising of the presser head, and means for removing the assembled bearing from the table.

29. A bearing assembling machine, comprising a table, means for moving the table with intermittent movement, a plurality of units on the table which are alternately at positions of rest in accordance with the intermittent movement of the table, a plurality of means stationed at positions of rest for feeding parts of a bearing to the units, a portion of each unit being spring pressed normally upwardly, a presser head stationed at one of the positions of rest which actuates in timed relation to the intermittent movements of the table to press the bearing parts together and complete the assemblage, said spring pressed unit projecting the assembled bearing upwardly upon the raising of the presser head, and a guard positioned in the path of the assembled bearing to engage the same and remove it from the table upon movement of the table.

In testimony whereof I affix my signature.

THOMAS C. PEW.